United States Patent
Lin et al.

(10) Patent No.: US 11,508,145 B2
(45) Date of Patent: Nov. 22, 2022

(54) METHOD FOR EVALUATING ENVIRONMENTAL NOISE OF DEVICE, APPARATUS, MEDIUM AND ELECTRONIC DEVICE

(71) Applicants: Beijing BOE Optoelectronics Technology Co., Ltd., Beijing (CN); BOE TECHNOLOGY GROUP CO., LTD., Beijing (CN)

(72) Inventors: Lin Lin, Beijing (CN); Jian Sun, Beijing (CN); Ziqiang Guo, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 259 days.

(21) Appl. No.: 16/768,532

(22) PCT Filed: Dec. 13, 2019

(86) PCT No.: PCT/CN2019/125220
§ 371 (c)(1),
(2) Date: May 29, 2020

(87) PCT Pub. No.: WO2020/140733
PCT Pub. Date: Jul. 9, 2020

(65) Prior Publication Data
US 2021/0241023 A1    Aug. 5, 2021

(30) Foreign Application Priority Data
Jan. 2, 2019    (CN) .......................... 201910001851.0

(51) Int. Cl.
*G06V 10/75* (2022.01)
*G06F 17/15* (2006.01)
(Continued)

(52) U.S. Cl.
CPC ........ *G06V 10/7515* (2022.01); *G06F 17/153* (2013.01); *G06F 17/16* (2013.01); *G06T 5/50* (2013.01); *G06V 10/75* (2022.01)

(58) Field of Classification Search
CPC ................... G06F 17/153; G06F 17/16; G06T 2207/20056; G06T 2207/20224;
(Continued)

(56) References Cited

U.S. PATENT DOCUMENTS

| 2012/0133836 | A1 | 5/2012 | Raffalli et al. |
| 2016/0255264 | A1* | 9/2016 | Russell ................. G06T 7/0008 348/226.1 |

(Continued)

FOREIGN PATENT DOCUMENTS

| CN | 101340600 A | 1/2009 |
| CN | 101599170 A | 12/2009 |

(Continued)

OTHER PUBLICATIONS

Francesco Ruotolo, "Immersive virtual reality and environmental noise assessment: An innovative audio-visual approach," Mar. 8, 2013, Environmental Impact Assessment Review 41 (2013), pp. 11-18.*

(Continued)

*Primary Examiner* — Omar S Ismail
(74) *Attorney, Agent, or Firm* — Xsensus LLP (57) ABSTRACT

The present disclosure provides a method, apparatus, medium, and electronic device for evaluating environmental noise of device. The method comprises obtaining original image data to be displayed; determining at least part of the
(Continued)

```
                    ┌─────────────────────────────────────────────┐  S332
                    │ Copy j-th column data of the original       │
                    │ image data to be displayed as the           │
                    │ comparison data                             │
                    └─────────────────────────────────────────────┘
                                          │
                                          ▼
                    ┌─────────────────────────────────────────────┐  S343
                    │ Use the comparison data as q-th column      │
                    │ data of the target image data to be         │
                    │ displayed                                   │
                    └─────────────────────────────────────────────┘
                                          │
                                          ▼
                    ┌─────────────────────────────────────────────┐  S344
                    │ Respectively use first to n-th column data  │
                    │ of the original image data to be displayed  │
                    │ as other column data of the target image    │
                    │ data to be displayed other than the q-th    │
                    │ column data                                 │
                    └─────────────────────────────────────────────┘
``` original image data to be displayed as source data; obtaining comparison data according to the source data; obtaining a difference value according to the comparison data and the source data; and evaluating environmental noise of device according to the difference value.

15 Claims, 8 Drawing Sheets

(51) Int. Cl.
*G06F 17/16* (2006.01)
*G06T 5/50* (2006.01)

(58) Field of Classification Search
CPC .. G06T 5/50; G06T 7/00; G06V 10/75; G06V 10/7515; G06V 20/20
See application file for complete search history.

(56) References Cited

U.S. PATENT DOCUMENTS

| | | | |
|---|---|---|---|
| 2017/0064363 A1* | 3/2017 | Wexler | H04N 5/23218 |
| 2017/0359467 A1* | 12/2017 | Norris | G06F 3/165 |
| 2018/0114054 A1* | 4/2018 | Dow | G06V 20/30 |
| 2019/0043260 A1* | 2/2019 | Anderson | G06V 40/20 |
| 2019/0389058 A1* | 12/2019 | Hayashi | B25J 9/0003 |

FOREIGN PATENT DOCUMENTS

| | | |
|---|---|---|
| CN | 102170581 A | 8/2011 |
| CN | 101599170 B | 9/2011 |
| CN | 104661021 A | 5/2015 |
| CN | 108805851 A | 11/2018 |
| CN | 108805852 A | 11/2018 |
| CN | 109726693 A | 5/2019 |

OTHER PUBLICATIONS

Tarek El-Ganainy , "Streaming Virtual Reality Content," Dec. 26, 2016 ,arXiv:1612.08350v1 [cs.MM] http://arxiv.org/abs/1612.08350 , pp. 1-6.*
Matt Yu,"A Framework to Evaluate Omnidirectional Video Coding Schemes," Nov. 12, 2015, 2015 IEEE International Symposium on Mixed and Augmented Reality, pp. 31-34.*
Erik Murphy-Chutorian,"Head Pose Estimation and Augmented Reality Tracking: An Integrated System and Evaluation for Monitoring Driver Awareness," Apr. 5, 2010, IEEE Transactions on Intelligent Transportation Systems, vol. 11, No. 2, Jun. 2010,pp. 300-307.*
International Search Report and Written Opinion dated Mar. 9, 2020 for PCT Patent Application PCT/CN2019/125220.
1st Office Action dated May 26, 2020 for Chinese Patent Application No. 201910001851.0.

* cited by examiner

$$\begin{bmatrix} Am,1 & Am,2 & \cdots\cdots & Am,n \\ A1,1 & A1,2 & \cdots\cdots & A1,n \\ A2,1 & A2,2 & \cdots\cdots & A2,n \\ \vdots & \vdots & \ddots & \vdots \\ A(m-2),1 & A(m-2),2 & \cdots\cdots & A(m-2),n \\ A(m-1),1 & A(m-1),2 & \cdots\cdots & A(m-1),n \\ Am,1 & Am,2 & \cdots\cdots & Am,n \end{bmatrix}$$

METHOD FOR EVALUATING ENVIRONMENTAL NOISE OF DEVICE, APPARATUS, MEDIUM AND ELECTRONIC DEVICE

CROSS REFERENCE TO RELATED APPLICATIONS

The present application is a § 371 national phase application of PCT Patent Application No. PCT/CN2019/125220, filed on Dec. 13, 2019, which claims the benefit of and priority to Chinese Patent Application No. 201910001851.0, filed on Jan. 2, 2019, the contents of which being incorporated by reference in their entireties herein.

TECHNICAL FIELD

The present disclosure relates to the technical field of electrical data processing and, in particular, to a method for evaluating environmental noise of device, an apparatus, a medium, and an electronic device.

BACKGROUND

In order to adapt to different application scenarios, such as indoor/outdoor scenarios, or high-temperature/low-temperature scenarios, Virtual Reality (VR)/Augmented Reality (AR) devices often need to perform a noise test operation, during a startup phase or after a certain time interval, to judge a status of current environment of a device, so as to facilitate selection of a corresponding filtering method to eliminate communication interference; or call an Intellectual Property (IP) core, or IP module that satisfies current application scenarios to complete execution of subsequent algorithms.

Inter-pupillary distance detection and gaze point/area detection of a software layer in a VR/AR system all require environmental detection to confirm a basic status of the space where the system is used, such as environmental noise and temperature of a user's environment.

It should be noted that the information disclosed in the Background section above is only used to enhance the understanding of the background of the present disclosure, and therefore may include information that does not constitute the prior art known to those of ordinary skill in the art.

SUMMARY

An object of the present disclosure is to provide a method for evaluating environmental noise of device, an apparatus for evaluating environmental noise of device, a storage medium, and an electronic device.

According to a first aspect of the present disclosure, there is provided a method for evaluating environmental noise of device, including: obtaining original image data to be displayed; determining at least part of the original image data to be displayed as source data; obtaining comparison data according to the source data; obtaining a difference value according to the comparison data and the source data, and evaluating environmental noise of device according to the difference value.

In an exemplary embodiment of the present disclosure, the method further includes storing the comparison data in an external memory and sending the original image data to be displayed to an image display terminal.

In an exemplary embodiment of the present disclosure, the method further includes: generating target image data to be displayed according to the comparison data and the original image data to be displayed; sending the target image data to be displayed to the image display terminal; wherein, in the target image data to be displayed, the comparison data and the source data are located in different address regions.

In an exemplary embodiment of the present disclosure, the original image data to be displayed is an m*n image matrix, and the source data is k-th row data and/or j-th column data of the original image data to be displayed; the obtaining the comparison data according to the source data, includes: copying the k-th row data and/or the j-th column data as the comparison data; wherein, m and n are positive integers greater than or equal to 1, k is a positive integer greater than or equal to 1 and less than or equal to m, and j is a positive integer greater than or equal to 1 and less than or equal to n.

In an exemplary embodiment of the present disclosure, if the comparison data is obtained by copying the k-th row data, the generating the target image data to be displayed according to the comparison data and the original image data to be displayed, includes: using the comparison data as i-th row data of the target image data to be displayed; respectively using first to m-th row data of the original image data to be displayed as other row data of the target image data to be displayed other than the i-th row data; wherein, i is a positive integer not equal to k, and greater than or equal to 1 and less than or equal to (m+1).

In an exemplary embodiment of the present disclosure, k is equal to m and i is equal to 1.

In an exemplary embodiment of the present disclosure, if the comparison data is obtained by copying the j-th column data, the generating the target image data to be displayed according to the comparison data and the original image data to be displayed, includes: using the comparison data as q-th column data of the target image data to be displayed; using first to n-th column data of the original image data to be displayed as other column data of the target image data to be displayed other than the q-th column data; wherein, q is a positive integer not equal to j, and greater than or equal to 1 and less than or equal to (n+1).

In an exemplary embodiment of the present disclosure, j is equal to n and q is equal to 1.

According to a second aspect of the present disclosure, there is provided a method for evaluating environmental noise of device, including: obtaining comparison data and original image data to be displayed, wherein at least part of the original image data to be displayed is source data, and the comparison data is obtained according to the source data; obtaining a difference value according to the source data and the comparison data; evaluating environmental noise of device according to the difference value.

In an exemplary embodiment of the present disclosure, the obtaining the comparison data and the original image data to be displayed, includes: respectively receiving the comparison data sent by an external memory and the original image data to be displayed sent by a processor; or receiving target image data to be displayed including the comparison data and the original image data to be displayed sent by the processor; wherein, in the target image data to be displayed, the comparison data and the source data are located in different address regions.

In an exemplary embodiment of the present disclosure, the obtaining the difference value according to the source data and the comparison data, includes obtaining the difference value by performing any one or more of AND operation, OR operation, covariance operation, correlation function operation, and convolution operation on the source data and the comparison data.

According to a third aspect of the present disclosure, there is provided a method for evaluating environmental noise of device, the device including a processor and an image display terminal; wherein, the method includes: obtaining, by the processor, original image data to be displayed, and determining at least part of the original image data to be displayed as source data; obtaining, by the processor, comparison data according to the source data; receiving, by the image display terminal, the comparison data and the original image data to be displayed; obtaining, by the image display terminal, a difference value according to the source data and the comparison data, and evaluating environmental noise of device according to the difference value.

According to a fourth aspect of the present disclosure, there is provided an apparatus for evaluating environmental noise of device, including: an original image data obtaining module, configured to obtain an original image data to be displayed; a source data determination module, configured to determine at least part of the original image data to be displayed as source data; a comparison data obtaining module, configured to obtain comparison data according to the source data; a noise evaluation module, configured to obtain a difference value according to the comparison data and the source data, and evaluate environmental noise of device according to the difference value.

According to a fifth aspect of the present disclosure, there is provided an apparatus for evaluating environmental noise of device, including: an image data receiving module, configured to obtain comparison data and original image data to be displayed, wherein at least part of the original image data to be displayed is source data, and the comparison data is obtained according to the source data; a difference value obtaining module, configured to obtain a difference value according to the source data and the comparison data; a noise evaluation module, configured to evaluate the environmental noise of device according to the difference value.

According to a sixth aspect of the present disclosure, there is provided a computer-readable medium on which a computer program is stored, and when the program is executed by a processor, the method for evaluating environmental noise of device described in any one of the above embodiments is implemented.

According to a seventh aspect of the present disclosure, there is provided an apparatus for evaluating environmental noise of device, including a processor and a memory, wherein, when computer-readable instructions stored in the memory are executed on the processor, this execution causes the apparatus for evaluating environmental noise of device to execute the method described in any one of the above embodiments.

It should be understood that the above general description and the following detailed description are only exemplary and explanatory, and do not limit the present disclosure.

BRIEF DESCRIPTION OF THE DRAWINGS

The drawings herein are incorporated into and constitute a part of this specification, show embodiments consistent with this disclosure, and are used together with the specification to explain the principles of this disclosure. Understandably, the drawings in the following description are only some embodiments of the present disclosure. For those of ordinary skill in the art, without paying any creative work, other drawings may be obtained based on these drawings.

DETAILED DESCRIPTION

Example embodiments will now be described more fully with reference to the drawings. However, the example embodiments may be implemented in various forms and should not be construed as being limited to the examples set forth herein; on the contrary, providing these embodiments makes the disclosure more comprehensive and complete, and fully conveys the concept of the example embodiments to those skilled in the art. The described features, structures, or characteristics may be combined in one or more embodiments in any suitable manner.

In addition, the drawings are only schematic illustrations of the present disclosure and are not necessarily drawn to scale. The same reference numerals in the drawings denote the same or similar parts, and thus their repeated description will be omitted. Some of the block diagrams shown in the drawings are functional entities and do not necessarily have to correspond to physically or logically independent entities. These functional entities may be implemented in the form of software, or implemented in one or more hardware modules or integrated circuits, or implemented in different networks and/or processor devices and/or microcontroller devices.

Figure 1:
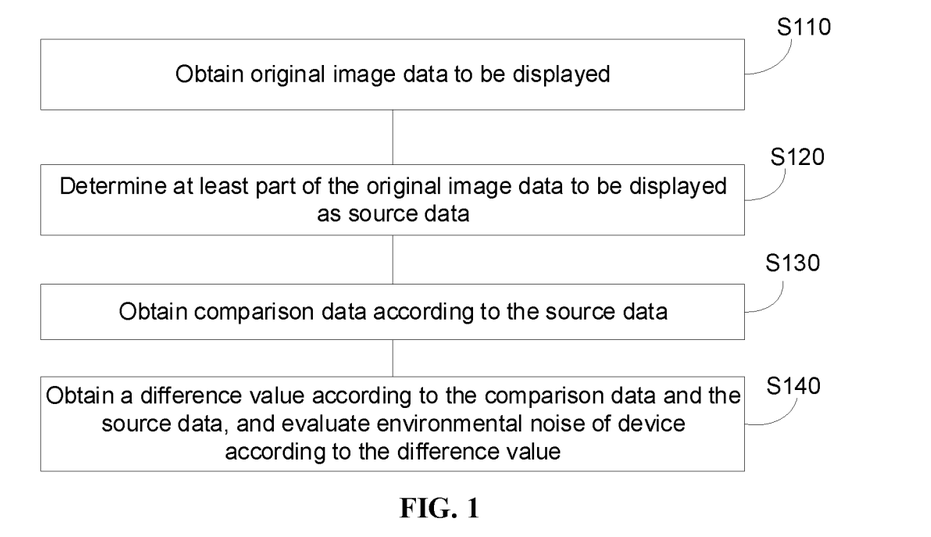
FIG. 1 schematically shows a flowchart of a method for evaluating environmental noise of device in an exemplary embodiment of the present disclosure.

FIG. 1 schematically shows a flowchart of a method for evaluating environmental noise of device in an exemplary embodiment of the present disclosure.

As shown in FIG. 1, the method for evaluating environmental noise of device provided by an embodiment of the present disclosure may include the following steps. In the embodiment of the present disclosure, the device may be a VR/AR device, and the VR/AR device may include a processor (such as an Application Processor (AP)) and an image display terminal (such as a Liquid Crystal Display (LCD)), but the present disclosure is not limited to this. In other embodiments, the device may also be any type of image display terminal such as Organic Light-Emitting Diode (OLED), electronic ink screen, etc. In the embodiment of the present disclosure, the method may be applied to the processor, but the present disclosure is not limited thereto.

In step S110, original image data to be displayed is obtained.

In step S120, at least part of the original image data to be displayed is determined as source data.

In step S130, comparison data is obtained according to the source data.

In step S140, a difference value is obtained according to the comparison data and the source data, and environmental noise of device is evaluated according to the difference value.

In an embodiment of the present disclosure, the environmental noise of device may refer to data skew or distortion caused by environmental changes during data transmission, wherein, environmental factors may include, for example, temperature and pressure.

In an embodiment of the present disclosure, the AP processor of the VR/AR device may generate target image data to be displayed according to the comparison data and the source data, and send the generated target image data to be displayed to an image display terminal of the VR/AR device.

In the target image data to be displayed, the comparison data may be used as a cyclic prefix (CP) of the target image data to be displayed, that is, a Guard Interval (GI) may be formed by adding the CP, so that, the source data and the comparison data may be compared to detect data distortion caused by interference such as noise, after the image display terminal of the VR/AR device receives the target image data to be displayed.

In an embodiment of the present disclosure, a length of the comparison data is a predetermined percentage of a length of the original image data to be displayed.

In an embodiments of the present disclosure, there is a requirement for CP length, the noise cannot be effectively detected if the CP length is too short, and if the CP length is too long, it will cause loss of power and information rate to the system. In the embodiment, a definition of the loss of power $v_{guard}$ may be:

$$v_{guard} = 10\log_{10}\left(\frac{T_g}{T_{FFT}} + 1\right)$$

where, Tg is a length of the CP or the GI, that is, the length of the comparison data; $T_{FFT}$ is a length after performing Fast Fourier Transformation (FFT) on the original image data to be displayed, that is, the length of the original image data to be displayed.

In an embodiment of the present disclosure, the length of the CP in the VR/AR device generally takes a value of 5%-20% of the length of the original image data to be displayed, but the present disclosure is not limited thereto.

The method for evaluating environmental noise of device provided by the embodiment of the present disclosure adopts a principle of the CP, applies it to the VR/AR device, and may be used to evaluate environmental noise in an environment in which the VR/AR device is used. On one hand, compared to the related technology which requires to separately add particular data and data to be compared with it in reverse, which is followed by operation of the two data, the present disclosure requires most ½ of the data resource required in the related art. On the other hand, because display of the VR/AR device is performed progressively, this solution does not require an independent clock cycle and may be time-multiplexed without extending response time of the device.

Figure 2:
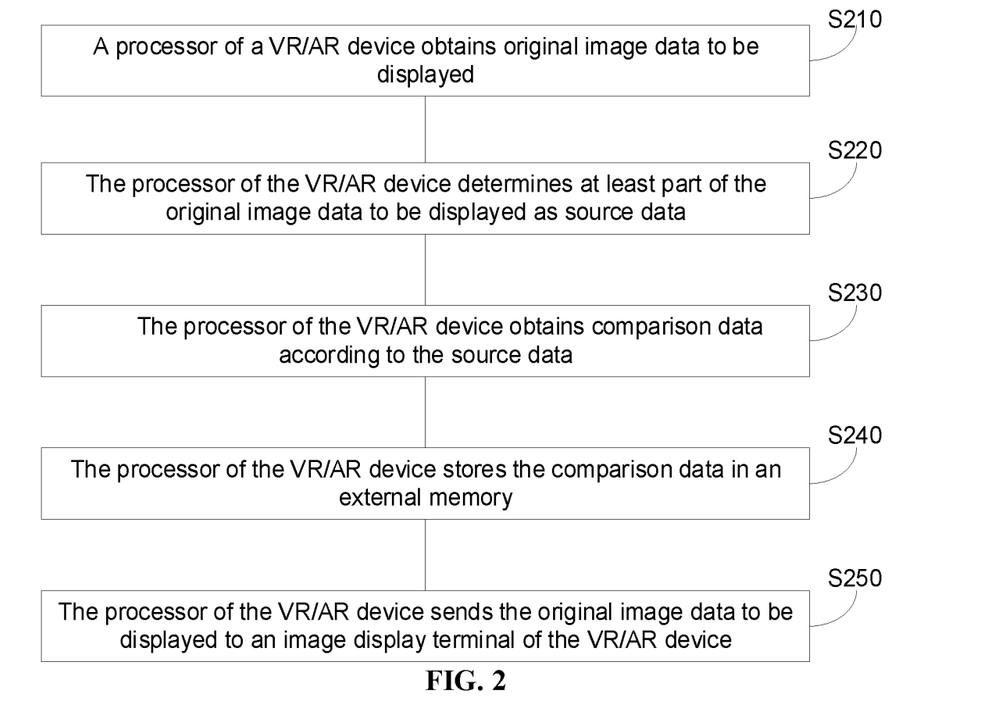
FIG. 2 schematically shows a flowchart of another method for evaluating environmental noise of device in an exemplary embodiment of the present disclosure.

FIG. 2 schematically shows a flowchart of another method for evaluating environmental noise of device in an exemplary embodiment of the present disclosure.

As shown in FIG. 2, the method for evaluating environmental noise of device provided by the embodiment of the present disclosure may include the following steps.

In step S210, a processor of a VR/AR device obtains original image data to be displayed.

In the embodiment of the present disclosure, it is assumed that the original image data to be displayed is an m*n image matrix:

$$\begin{bmatrix} A1,1 & A1,2 & \cdots & A1,n \\ A2,2 & A2,2 & \cdots & A2,n \\ \vdots & \vdots & \ddots & \vdots \\ A(m-2),1 & A(m-2),2 & \cdots & A(m-2),n \\ A(m-1),1 & A(m-1),2 & \cdots & A(m-1),n \\ Am,1 & Am,2 & \cdots & Am,n \end{bmatrix}$$

where, m and n are positive integers greater than or equal to 1.

In step S220, the processor of the VR/AR device determines at least part of the original image data to be displayed as source data.

In an embodiment of the present disclosure, the source data may be k-th row data and/or j-th column data of the original image data to be displayed. However, the present disclosure is not limited to this, the source data may be any part of the original image data to be displayed, and the source data may also be a combination of partial data of different blocks in the original image data to be displayed, for example, the source data may include first few data elements in the first row data and all data in a fourth row data of the original image data to be displayed.

In step S230, the processor of the VR/AR device obtains comparison data according to the source data.

In an embodiment of the present disclosure, the obtaining the comparison data according to the source data may include copying the k-th row data and/or the j-th column data as the comparison data, where k is a positive integer greater than or equal to 1 and less than or equal to m, and j is a positive integer greater than or equal to 1 and less than or equal to n.

That is, in some embodiments, the source data may be directly used as the comparison data, but the disclosure is not limited thereto, as long as there is a correlation between the source data and the comparison data, and easy-to-analyze data processing relationships are possible. In other embodiments, the source data may also be inverted to obtain the comparison data. For example, assuming that the source data is 00001111, the comparison data obtained after the inversion is 11110000.

In step S240, the processor of the VR/AR device stores the comparison data in an external memory.

In an embodiment of the present disclosure, after the processor of the VR/AR device generates the comparison data, which may be stored in the external memory of the VR/AR device.

Step S250, the processor of the VR/AR device sends the original image data to be displayed to an image display terminal of the VR/AR device.

In an embodiment of the present disclosure, when the source data and the comparison data need to be further processed in order to evaluate the VR/AR environmental noise of device, the comparison data stored in the external memory may be sent to the image display terminal by communication.

Figure 3:
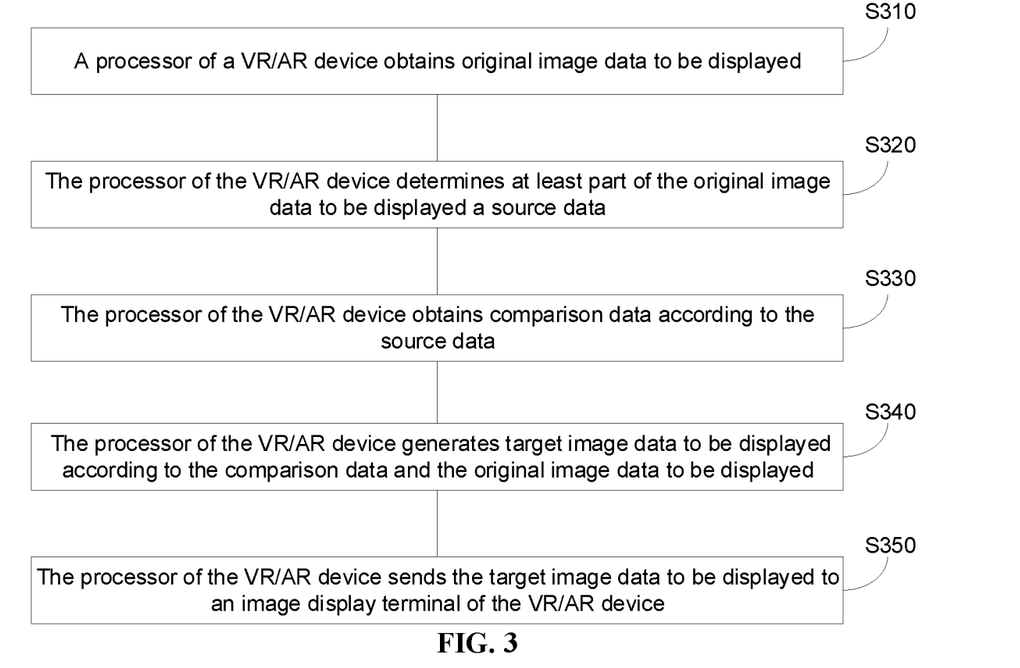
FIG. 3 schematically shows a flowchart of yet another method for evaluating environmental noise of device in an exemplary embodiment of the present disclosure.

FIG. 3 schematically shows a flowchart of another method for evaluating environmental noise of device in an exemplary embodiment of the present disclosure.

As shown in FIG. 2, the method for evaluating environmental noise of device provided by an embodiment of the present disclosure may include the following steps.

In step S310, a processor of a VR/AR device obtains original image data to be displayed.

In step S320, the processor of the VR/AR device determines at least part of the original image data to be displayed a source data.

In step S330, the processor of the VR/AR device obtains comparison data according to the source data.

For Steps S310-S330 in the embodiment of the present disclosure, reference may be made to Steps S210-S230 in the embodiment shown in FIG. 2 above.

In step S340, the processor of the VR/AR device generates target image data to be displayed according to the comparison data and the original image data to be displayed.

In the target image data to be displayed, the comparison data and the source data are located in different address regions.

In an embodiment of the present disclosure, if the comparison data and the source data are close to each other, they may be affected by a same interference, thereby affecting the effect of evaluating the VR/AR environmental noise of device. Therefore, the comparison data and the source data are required to be placed in the different address regions, wherein an interval between the address regions may be designed according to actual conditions, which is not limited in this disclosure.

In step S350, the processor of the VR/AR device sends the target image data to be displayed to an image display terminal of the VR/AR device.

In the embodiment of FIG. 3, an AP processor in the VR/AR device processes the original image data to be displayed to generate new target image data to be displayed, and then the AP processor sends the new target image data to be displayed to the image display terminal of the VR/AR device, such as an LCD display. The image display terminal processes the received new target image data to be displayed to calculate a difference value between the source data and the comparison data.

It can be known from the foregoing embodiments of FIG. 2 and FIG. 3 that the method provided by the embodiments of the present disclosure has flexible storage locations of the generated comparison data, which may be stored inside and outside the image matrix.

Figure 4:
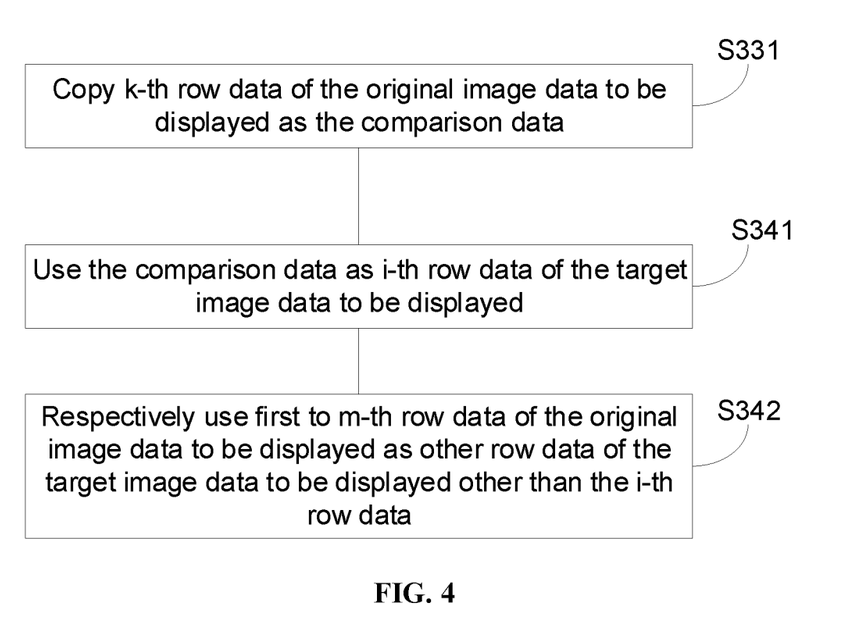
FIG. 4 shows a schematic diagram of the processing procedures of Steps S330 and S340 shown in FIG. 3 in an embodiment.

FIG. 4 shows a schematic diagram of the processing procedures in steps S330 and S340 shown in FIG. 3. Row data of the image matrix {m*n} of the original image data to be displayed may be copied to form a cyclic prefix (CP).

As shown in FIG. 4, the above Step S330 may further include step S331: copying k-th row data of the original image data to be displayed as the comparison data.

With continued reference to FIG. 4, the above step S340 may further include the following steps.

In step S341, the comparison data is used as i-th row data of the target image data to be displayed.

Wherein, i is a positive integer not equal to k and greater than or equal to 1 and less than or equal to (m+1).

In step S342, first to m-th row data of the original image data to be displayed is respectively used as other row data of the target image data to be displayed other than the i-th row data. In particular, step S342 may be implemented by: using first to (i−1)-th row data of the original image data to be displayed as first to (i−1)-th row data of the target image data to be displayed; using i-th row data of the original image data to be displayed as (i+1)-th row data of the target image data to be displayed; and using (i+1)-th to m-th row data of the original image data to be displayed as (i+2)-th to (m+1)-th row data of the target image data to be displayed.

Figure 5:
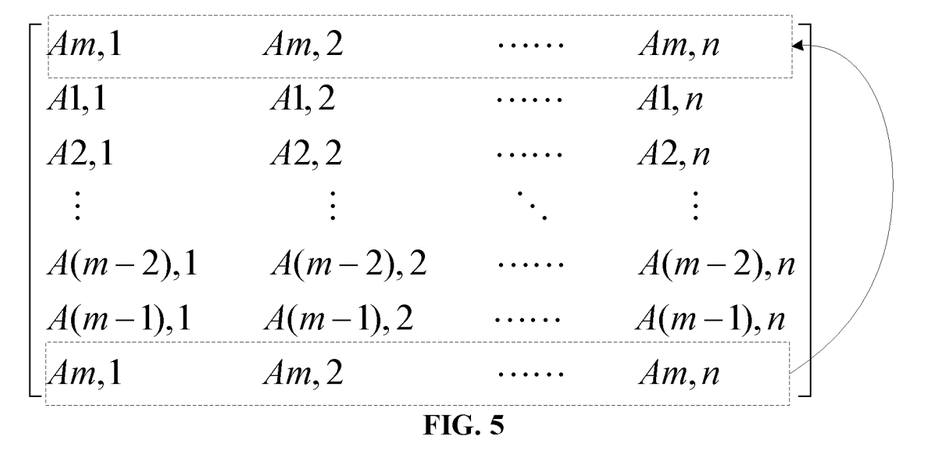
FIG. 5 shows a schematic processing diagram of the embodiment shown in FIG. 4.

FIG. 5 shows a schematic processing diagram of the embodiment shown in FIG. 4. In the embodiment of FIG. 5, assuming that k is equal to m and i is equal to 1, that is, m-th row (that is, last row) of data of the original image data to be displayed is copied as the comparison data, and meanwhile, the m-th row data of the original image data to be displayed is used as the source data. And the m-th row data of the original image data to be displayed is copied to a row before the first row of the original image data to be displayed, as the first row of new image matrix {(m+1)*n} of the new target image data to be displayed shown in FIG. 5.

In other embodiments, 1-th row (that is, first row) data of the original image data to be displayed may be copied as the comparison data, and the 1-th row of the original image data to be displayed may be used as the source data. Also, the first row data of the original image data to be displayed is copied to a row after the m-th row of the original image data to be displayed, as a last row of the new image matrix {(m+1)*n} of the new target image data to be displayed.

Figure 6:
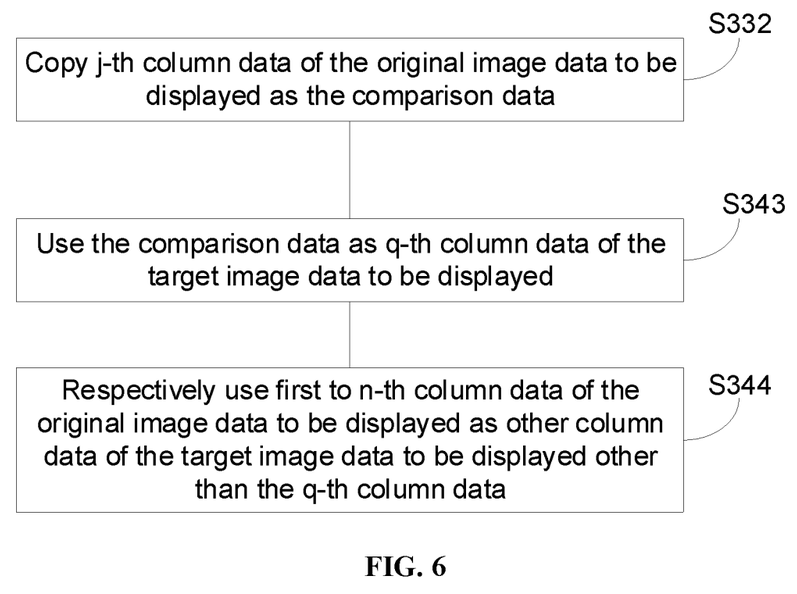
FIG. 6 shows a schematic diagram of the processing procedures of Steps S330 and S340 shown in FIG. 3 in another embodiment.

FIG. 6 shows a schematic processing diagram of steps S330 and S340 shown in FIG. 3 in another embodiment. Column data of the image matrix {m*n} of the original image data to be displayed may be copied to form a CP.

As shown in FIG. 6, the above step S330 may further include step S332: copying j-th column data of the original image data to be displayed as the comparison data.

With continued reference to FIG. 4, the step S340 described above may further include the following steps.

In step S343, the comparison data is used as q-th column data of the target image data to be displayed.

Wherein, q is a positive integer not equal to j, and greater than or equal to 1 and less than or equal to (n+1).

In step S344, first to n-th column data of the original image data to be displayed is respectively used as other column data of the target image data to be displayed other than the q-th column data. In particular, step S344 may be implemented by: using first to (q−1)-th column data of the original image data to be displayed as first to (q−1)-th column data of the target image data to be displayed; using q-th column data of the original image data to be displayed as (q+1)-th column data of the target image data to be displayed; and using (q+1)-th to n-th column data of the original image data to be displayed as (q+2)-th to (n+1)-th column data of the target image data to be displayed.

Figure 7:
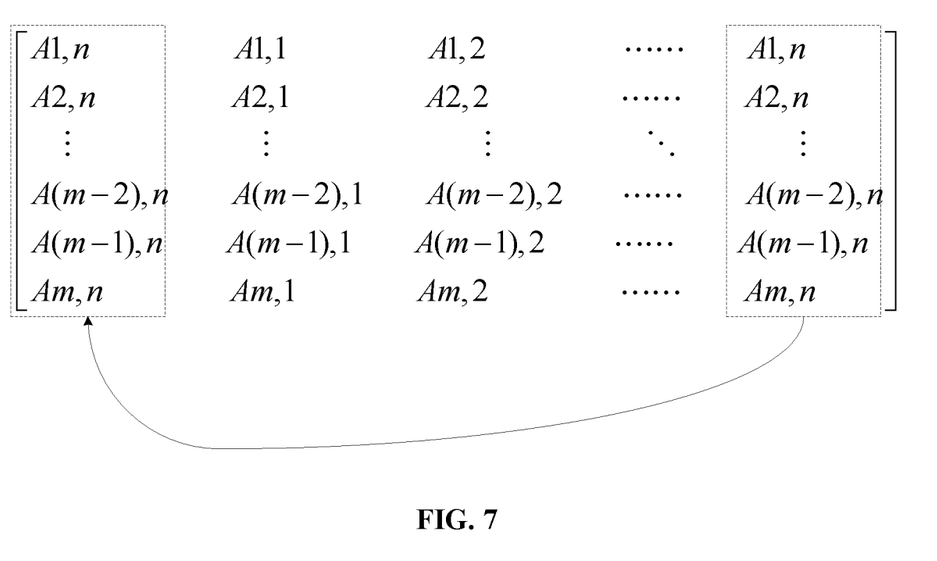
FIG. 7 shows a schematic processing diagram of the embodiment shown in FIG. 6.

FIG. 7 shows a schematic processing diagram of the embodiment shown in FIG. 6. In the embodiment of FIG. 7, assuming that j is equal to n and q is equal to 1, that is, the n-th column (that is, the last column) data of the original image data to be displayed is copies as the comparison data, and meanwhile, the n-th column data of the original image data to be displayed is used as the source data. And the n-th column data of the original image data to be displayed is copied to a column before the first column of the original image data to be displayed, as first column of a new image matrix $\{m*(n+1)\}$ of the new target image data to be displayed shown in FIG. 7.

In other embodiments, 1-th column (that is, first column) data of the original image data to be displayed may be copied as the comparison data, and the 1-th column of the original image data to be displayed may be used as the source data. Also, the 1-th column data of the original image data to be displayed is copied to a column after the n-th column of the original image data to be displayed, as a last column of the new image matrix $\{m*(n+1)\}$ of the new target image data to be displayed.

Figure 8:
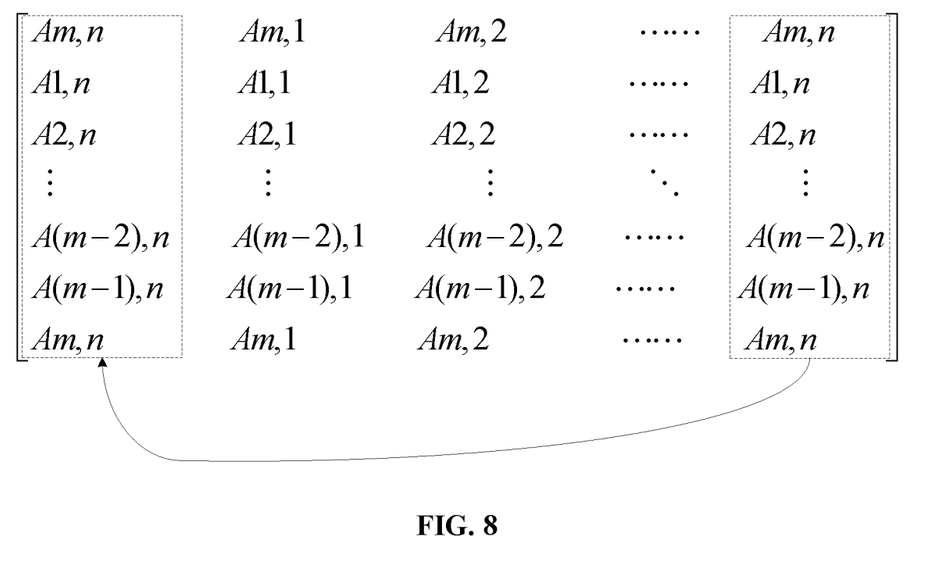
FIG. 8 shows a schematic diagram of the processing procedure of Step S340 shown in FIG. 3 in yet another embodiment.

FIG. 8 shows a schematic processing diagram of step S340 shown in FIG. 3 in still another embodiment.

In the embodiment of FIG. 8, m-th row data of the original image data to be displayed may be first copied to a row before the first row of the original image data to be displayed, that is, the image matrix shown in FIG. 5 may be obtained.

Then, the n-th column data of the image matrix shown in FIG. 5 may also be copied to a column before the first column of the image matrix shown in FIG. 5, and the target image data to be displayed as shown in FIG. 8 as an $(m+1)*(N+1)$ image matrix is finally obtained.

It should be noted that in the embodiment of the present disclosure, a location of the comparison data in the target image data to be displayed may be arbitrarily set, as long as it is not located in a same address regions as the source data, which is not limited to copying tail of the original image data to be displayed to header of the original image data to be displayed as mentioned above. It may be any location that is easy to find and it is even possible to put the comparison data outside the image matrix of the original image data to be displayed.

Similarly, the source data in the embodiment of the present disclosure may come from any location of the original image data to be displayed, and is not limited to the tail of the original image data to be displayed. Similarly, a target location of the comparison data is also not required to be at head of the target image data to be displayed, as long as the source data and the comparison data are located in different address regions, and the interval of the regions may also be set freely. A separation distance between the source data and the comparison data is related to actual application environment and needs to be confirmed by an actual system test. If the source data and the comparison data are close to each other and suffer same interference simultaneously, the comparison effect is affected.

Meanwhile, the source data in the embodiment of the present disclosure is not required to be complete data of an entire row or column of the image matrix of the original image data to be displayed, but may be data of a certain part of the image matrix of the original image data to be displayed; the comparison data is not limited to the copy of the source data, and it will meet the requirements as long as there is a certain mathematical relationship between them, and is easy to parse out the difference value in subsequent operations.

Figure 9:
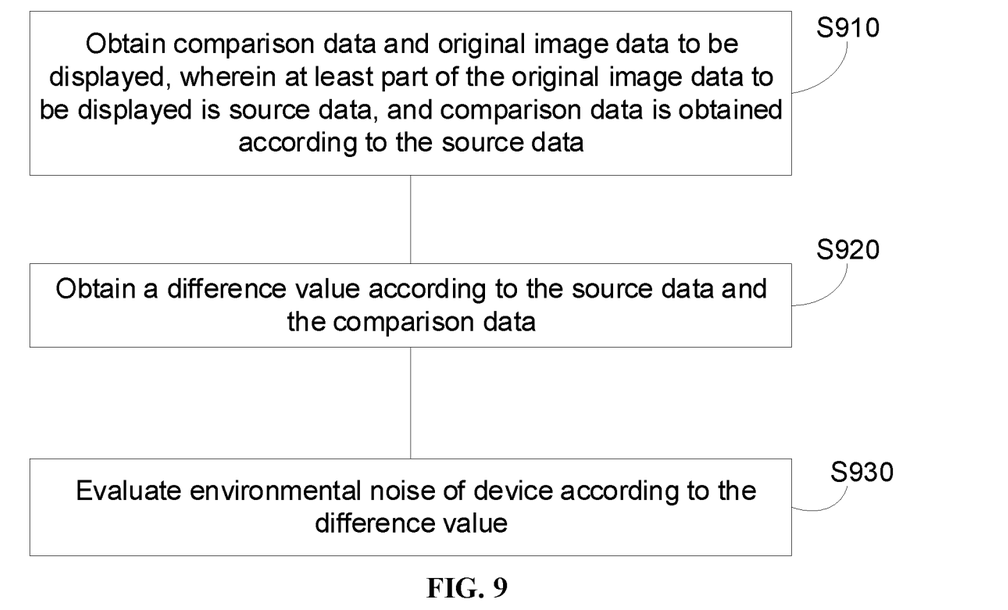
FIG. 9 schematically shows a flowchart of another method for evaluating environmental noise of device in an exemplary embodiment of the present disclosure.

FIG. 9 schematically shows a flowchart of yet another method for evaluating environmental noise of device in an exemplary embodiment of the present disclosure. The device may be a VR/AR device, the VR/AR device may include a processor and an image display terminal, and the method may be applied to the image display terminal.

As shown in FIG. 9, the method for evaluating environmental noise of device provided by the embodiment of the present disclosure may include the following steps.

In step S910, comparison data and original image data to be displayed are obtained, wherein at least part of the original image data to be displayed is source data, and comparison data is obtained according to the source data.

In an exemplary embodiment, a length of the source data is a predetermined percentage of a length of the original image data to be displayed.

In an embodiment of the present disclosure, before the processor of the VR/AR device transmits the original image data to be displayed, the image display terminal of the VR/AR device has predetermined which part of address data in the original image data to be displayed is determined as source data. For the image display terminal, after the processor determines which part of the address data is the source data, it has learned the data in which address region is the source data.

In an exemplary embodiment, the obtaining the comparison data and the original image data to be displayed may include: receiving the comparison data sent by an external memory and the original image data to be displayed sent by the processor; or receiving target image data to be displayed including the comparison data and the original image data to be displayed sent by the processor; wherein, in the target image data to be displayed, the comparison data and the source data are located in different address regions.

In step S920, a difference value is obtained according to the source data and the comparison data.

In an exemplary embodiment, the obtaining the difference value according to the source data and the comparison data may include obtaining the difference value by performing any one or more of AND operation, OR operation, covariance operation, correlation function operation, and convolution operation on the source data and the comparison data.

In step S930, environmental noise of device is evaluated according to the difference value.

The source data here may indicate data in the determined address of the original image data to be displayed or the target image data to be displayed, and the comparison data may indicate data in another address determined in the target image data to be displayed or data sent from the external memory. Before transmission, the comparison data and the source data are the same, but due to presence of noise during the transmission, the two will change, so that the environmental noise of device may be evaluated by calculating the difference value between the two.

In an embodiment of the present disclosure, the embodiment of FIG. 5 or FIG. 7 is taken as an example for illustration, it is assumed that the image display terminal of the VR/AR device receives the target image data to be displayed sent by the processor of the VR/AR device, the source data in the target image data to be displayed is a last row or a last column data of the original image data to be displayed, the source data is copied as the comparison data, and the comparison data is used as a first row or a column of the target image data to be displayed. In this case, the image display terminal of the VR/AR device may temporarily store a first row or a column data of a new image matrix of the target image data to be displayed, the first row or the first column data of the new image matrix is not involved in displaying the image. When the last row data or the last column data of the new image matrix arrives, since the first row data and the last row data or the first column data and the last column data may be affected by the environmental noise of device during a data transmission, data distortion occurs in the first row data and last row data or first column data and last column data which are the same at the sending end. In this case, the received first row data with the last row data or the first column data with the last column data may be compared to analyze their difference, and the judgment standard of the difference value depends on the calculation method.

In an embodiment of the present disclosure, comparison operation for calculating the difference value may be selected according to software architecture or processing capacity. Simple operation such as AND/OR operation may be performed. Slightly more complex operation, such as cross-correlation functions, covariance, and convolution, may be performed to obtain the difference value.

The magnitude of the difference value characterizes the interference degree of the VR/AR device in the current environment. A large difference value indicates that the environmental noise of device is large; a small difference value indicates that the environmental noise of device is small. According to the magnitude of the difference value, a corresponding processing scheme may be selected, such as adding Gaussian filtering.

In an embodiment of the present disclosure, a tolerance and critical point of the difference value need to be confirmed by actual system testing. The tolerance and critical point of the difference value depends on system accuracy required by a customer or a design. The tolerance and critical point of the difference value varies with the system requirements and may be flexibly defined. The corresponding processing scheme depends on an interference type or noise type encountered in actual use.

It should be noted that the algorithm applied to hardware part is a circuit board, parameters of each batch of the circuit board are different. In demanding scenarios, high-speed partial impedance matching must be considered. Moreover, the circuit board is only a part of the system, which needs to be combined with different mechanical structures and optical devices to form a complete machine, which is very different. It needs to be debugged and meet the requirements of the complete machine, and then check the critical point, difference value and tolerance, interval of the address regions and other parameters range. For example, an approximate range may be first confirmed during commissioning process of 1-2 devices, and then applied it to a batch. If there still is very few in the batch that do not meet the requirements, and manual debugging may be performed again. In engineering applications, the parameters may be debugged and confirmed in this way. In the embodiment of the present disclosure, all items that need to be confirmed by debugging may be set in a form of macro definition parameters, and the parameters may be directly modified during the debugging process without repeated burning.

In the method for evaluating environmental noise of device provided by an embodiment of the present disclosure, by copying at least part of data of an original image matrix to be displayed to a certain location, and calculating a correlation between source data and comparison data at two different locations after transmission, the comparison method is flexible. AND/OR, covariance, correlation function, convolution, etc. may be used to obtain the difference value proportional to the VR/AR environmental noise of device, and may be applied to real-time environmental noise detection of the VR/AR device. Compared with the method in the related art that uses multiple images received before and after comparison to calculate noise, one image may be used to calculate the environmental noise of device. That is, the method provided in this embodiment has a small calculation amount and a fast comparison speed. Of course, in other embodiments, the difference values of multiple images may also be averaged as the difference value that is finally used to evaluate the environmental noise of device, which depends on the accuracy required by the complete machine system.

Figure 10:
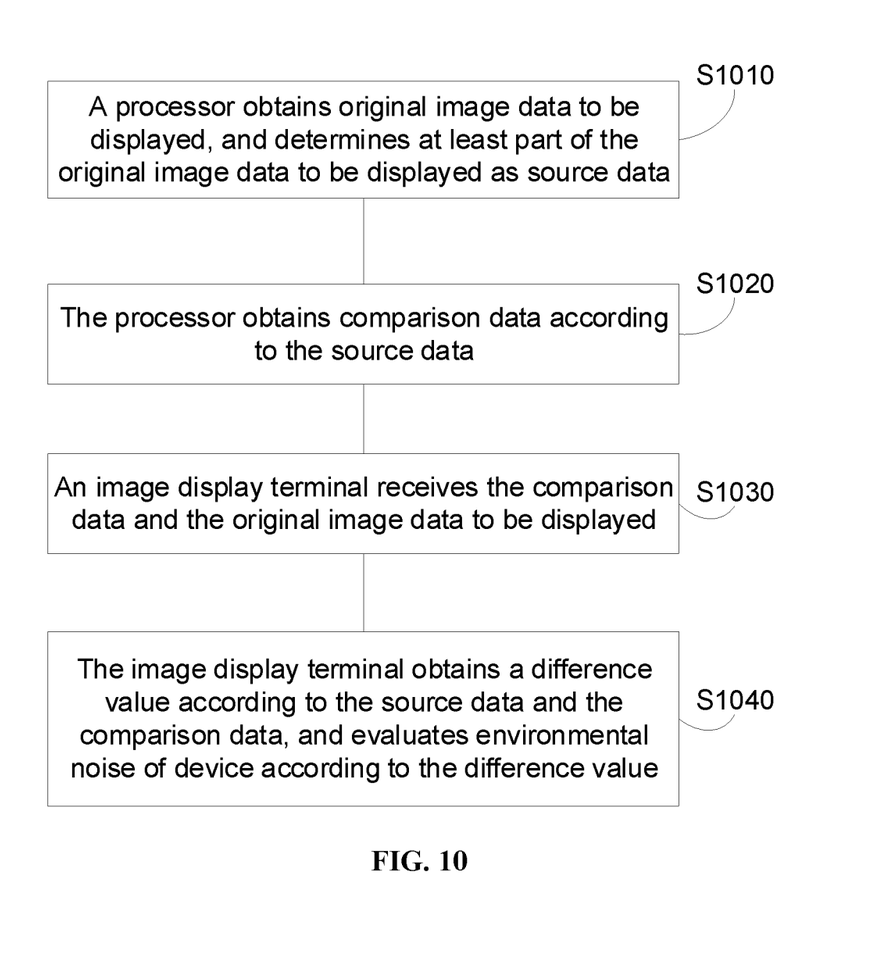
FIG. 10 schematically shows a flowchart of another method for evaluating environmental noise of device in an exemplary embodiment of the present disclosure.

FIG. 10 schematically shows a flowchart of yet another method for evaluating environmental noise of device in an exemplary embodiment of the present disclosure. The device may include a processor and an image display terminal.

As shown in FIG. 10, the method for evaluating environmental noise of device provided by an embodiment of the present disclosure may include the following steps.

In step S1010, the processor obtains original image data to be displayed, and determines at least part of the original image data to be displayed as source data.

In step S1020, the processor obtains comparison data according to the source data.

In step S1030, the image display terminal receives the comparison data and the original image data to be displayed.

In step S1040, the image display terminal obtains a difference value according to the source data and the comparison data, and evaluates environmental noise of device according to the difference value.

For the specific implementation of the steps in the embodiments of the present disclosure, reference may be made to the descriptions in other embodiments above.

It should be noted that the above drawings are only schematic illustrations of the processes included in the method according to the exemplary embodiment of the present disclosure, and are not intended to limit the purpose. It is understood that the processes shown in the above drawings do not indicate or limit the chronological order of these processes. In addition, it is also easy to understand that these processes may be performed synchronously or asynchronously in multiple modules.

Figure 11:
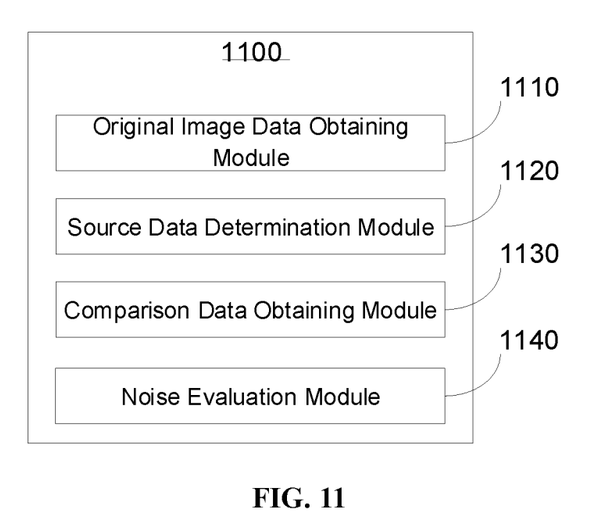
FIG. 11 schematically shows a schematic composition diagram of an apparatus for evaluating environmental noise of device in an exemplary embodiment of the present disclosure.

FIG. 11 schematically shows a composition diagram of an apparatus for evaluating environmental noise of device in an exemplary embodiment of the present disclosure. The device may be a VR/AR device, the VR/AR device may include a processor and an image display terminal, and the apparatus may be applied to the processor.

As shown in FIG. 11, an apparatus 1100 for evaluating environmental noise of device provided by an embodiment of the present disclosure may include an original image data obtaining module 1110, a source data determination module 1120, a comparison data obtaining module 1130, and a noise evaluation module 1140.

The original image data obtaining module 1110 may be configured to obtain original image data to be displayed.

The source data determination module 1120 may be configured to determine at least part of the original image data to be displayed as source data.

The comparison data obtaining module 1130 may be configured to obtain comparison data according to the source data.

The noise evaluation module 1140 may be configured to obtain a difference value according to the comparison data and the source data, and evaluate environmental noise of device according to the difference value.

In an exemplary embodiment, wherein a length of the comparison data is a predetermined percentage of a length of the original image data to be displayed.

In an exemplary embodiment, the apparatus 1100 for evaluating environmental noise of device may further include: a comparison data storage module, configured to store the comparison data in an external memory; an original image data sending module, configured to send the original image data to be displayed to the image display terminal.

In an exemplary embodiment, the apparatus 1100 for evaluating environmental noise of device may further include: a target image data generation module, configured to generate target image data to be displayed according to the comparison data and the original image data to be displayed; a target image data sending module, configured to send the target image data to be displayed to the image display terminal. In the embodiment, in the target image data to be displayed, the comparison data and the source data are located in different address regions.

In an exemplary embodiment, the original image data to be displayed is an m*n image matrix, and the source data is k-th row data and/or j-th column data of the original image data to be displayed. The comparison data obtaining module 1130 may include: a copying unit, configured to copy the k-th row data and/or the j-th column data as the comparison data. Integers m and n are positive integers greater than or equal to 1, k is a positive integer greater than or equal to 1 and less than or equal to m, and j is a positive integer greater than or equal to 1 and less than or equal to n.

In an exemplary embodiment, if the comparison data is obtained by copying the k-th row data, the target image data generation module may include: a first target image data generation unit, configured to use the comparison data as i-th row data of the target image data to be displayed; a second target image data generation unit, configured to respectively use first to m-th row data of the original image data to be displayed as other row data of the target image data to be displayed other than the i-th row data. Wherein, i is a positive integer not equal to k, and greater than or equal to 1 and less than or equal to (m+1).

In an exemplary embodiment, k may be equal to m and i is equal to 1.

In an exemplary embodiment, if the comparison data is obtained by copying the j-th column data, the target image data generation module may include: a third target image data generation unit, configured to use the comparison data as q-th column data of the target image data to be displayed; a fourth target image data generation unit, configured to respectively use first to n-th column data of the original image data to be displayed as other column data of the target image data to be displayed other than the q-th column data. Wherein, q is a positive integer not equal to j, and greater than or equal to 1 and less than or equal to (n+1).

In an exemplary embodiment, j may be equal to n and q is equal to 1.

Figure 12:
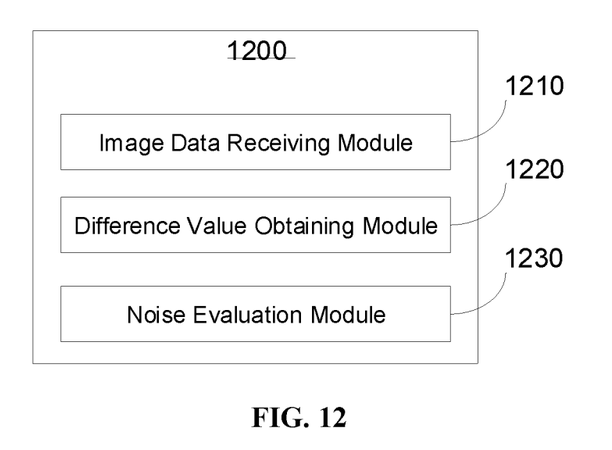
FIG. 12 schematically shows another schematic diagram of an apparatus for evaluating environmental noise of device in an exemplary embodiment of the present disclosure.

FIG. 12 schematically shows another schematic diagram of an apparatus for evaluating environmental noise of device in an exemplary embodiment of the present disclosure. The device is a VR/AR device. The VR/AR device includes a processor and an image display terminal. The method is applied to the image display terminal.

As shown in FIG. 12, the apparatus 1200 for evaluating environmental noise of device provided by an embodiment of the present disclosure may include an image data receiving module 1210, a difference value obtaining module 1220, and an environmental noise evaluation module 1230.

The image data receiving module 1210 may be configured to obtain comparison data and original image data to be displayed, at least part of the original image data to be displayed is source data, and the comparison data is obtained according to the source data.

In an exemplary embodiment, a length of the comparison data is a predetermined percentage of a length of the original image data to be displayed.

The difference value obtaining module 1220 may be configured to obtain a difference value according to the source data and the comparison data.

The environmental noise evaluation module 1230 may be configured to evaluate the environmental noise of device according to the difference value.

In an exemplary embodiment, the device may be a VR/AR device, the VR/AR device may include a processor and an image display terminal, and the apparatus may be applied to the image display terminal.

In an exemplary embodiment, the image data receiving module 1210 may include: a first image data receiving unit, configured to respectively receive the comparison data sent by an external memory and the original image data to be displayed sent by the processor; or a second image data receiving unit, configured to receive target image data to be displayed including the comparison data and the original image data to be displayed sent by the processor. Wherein, in the target image data to be displayed, the comparison data and the source data are located in different address regions.

In an exemplary embodiment, the difference value obtaining module 1220 may include: a difference value calculation unit, configured to obtain the difference value by performing any one or more of the source data and the comparison data in an AND operation, OR operation, covariance operation, correlation function operation, and convolution operation.

Regarding the apparatus in the above embodiments, a specific manner in which each module or unit performs operations has been described in detail in the embodiments related to the method, and will not be described in detail here.

It should be noted that although several modules or units of the device for action execution are mentioned in the above detailed description, this division is not mandatory. Several modules or units described above have data processing capabilities and/or program execution capabilities, including but not limited to processors, microcontrollers, Digital Signal Processing (DSP), and Application Specific Integrated Circuits (ASIC) and other devices. The processor may be, for example, a Central Processing Unit (CPU), a Field-Programmable Gate Array (FPGA), or a Tensor Processing Unit (TPU). One or more chips in the above device may be included. In fact, according to the embodiments of the present disclosure, the features and functions of the two or more modules or units described above may be embodied in one module or unit. Conversely, the features and functions of one module or unit described above may be further divided into multiple modules or units to be embodied. The components displayed as modules or units may or may not be physical units, that is, they may be located in one place, or may be distributed on multiple network units. Part or all of the modules may be selected according to actual needs to achieve the purpose of the present disclosure. Those of ordinary skill in the art may understand and implement without paying creative labor.

In an exemplary embodiment of the present disclosure, there is also provided an electronic device capable of implementing the above method for evaluating environmental noise of device.

Those skilled in the art may understand that various aspects of the present disclosure can be implemented as a system, method, or program product. Therefore, various aspects of the present disclosure may be specifically implemented in a form of a complete hardware implementation, a complete software implementation (including firmware, microcode, etc.), or a combination of hardware and software implementations, which may be referred to herein "circuit", "module" or "system".

An electronic device 600 according to this embodiment of the present disclosure is described below with reference to FIG. 13. The electronic device 600 shown in FIG. 13 is just an example, and should not bring any limitation to the functions and use scope of the embodiments of the present disclosure.

Figure 13:
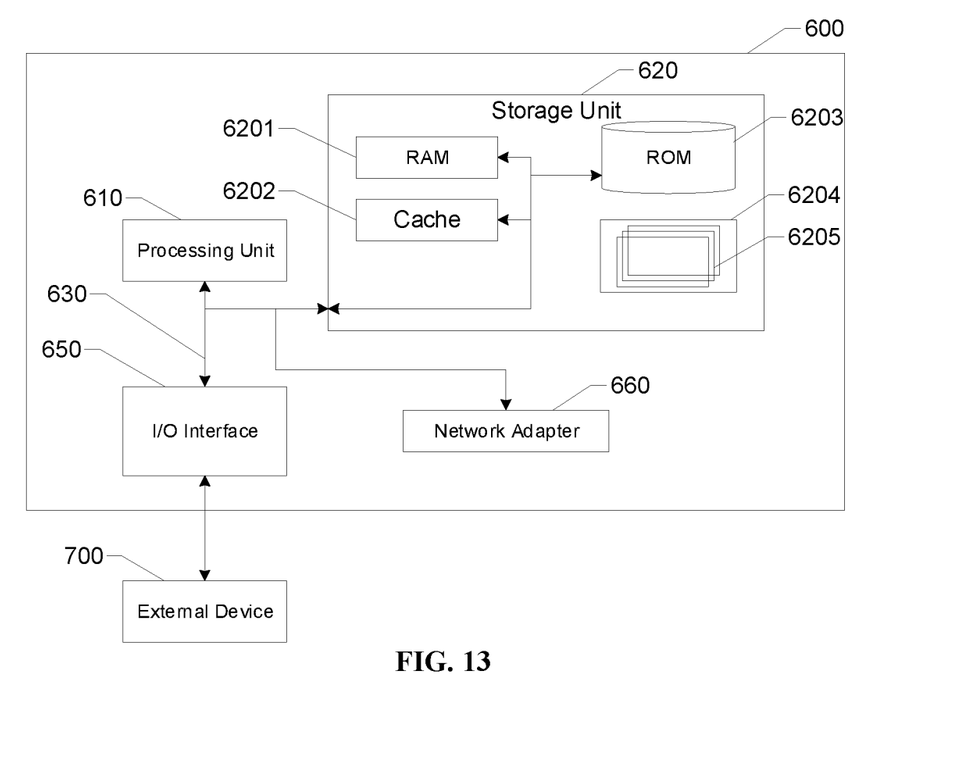
FIG. 13 schematically shows still another schematic diagram of an apparatus for evaluating environmental noise of device in an exemplary embodiment of the present disclosure.

As shown in FIG. 13, the electronic device 600 is represented in the form of a general-purpose computing device. Components of the electronic device 600 may include, but are not limited to: at least one processing unit 610, at least one storage unit 620, and a bus 630 connecting different system components (including the storage unit 620 and the processing unit 610).

The storage unit stores a program code, and the program code may be executed by the processing unit 610, so that the processing unit 610 executes or instructs other elements to perform the steps according to various exemplary embodiments of the present disclosure described in the "Exemplary Method" section of this specification above. For example, as shown in FIG. 1, the processing unit 610 may execute: step S110, obtain original image data to be displayed; step S120, determine at least part of the original image data to be displayed as source data; step S130, obtain comparison data according to the source data; and step S140, obtain a difference value according to the comparison data and the source data, and evaluate environmental noise of device according to the difference value.

The storage unit 620 may include a readable medium in a form of a volatile storage unit, such as a random access storage (RAM) unit 6201 and/or a cache storage unit 6202, and may further include a read-only storage (ROM) unit 6203.

The storage unit 620 may further include a program/utility tool 6204 having a set of (at least one) program modules 6205. Such program modules 6205 include but are not limited to: an operating system, one or more application programs, other program modules, and program data. Each of these examples or some combination may include an implementation of the network environment.

The bus 630 may be one or more of several types of bus structures, including a storage unit bus or a storage unit controller, a peripheral bus, a graphics acceleration port, a processing unit, or a local bus using any of a variety of bus structures.

The electronic device 600 may also communicate with one or more external devices 700 (e.g., a keyboard, a pointing device, a Bluetooth device, etc.), and may also communicate with one or more devices that enable a user to interact with the electronic device 600, and/or communicate with any device (e.g., a router, a modem, etc.) that enables the electronic device 600 to communicate with one or more other computing devices. Such communication may be performed through an input/output (I/O) interface 650. Moreover, the electronic device 600 may also communicate with one or more networks (such as a local area network (LAN), a wide area network (WAN), and/or a public network, such as the Internet) through a network adapter 660. As shown in the figure, the network adapter 660 communicates with other modules of the electronic device 600 through the bus 630. It should be understood that although not shown in the figure, other hardware and/or software modules may be used in conjunction with the electronic device 600, including but not limited to: a microcode, a device driver, a redundant processing unit, an external disk drive array, a RAID system, a tape drive, and a data backup storage system.

Through the description of the above embodiments, those skilled in the art may easily understand that the example embodiments described here may be implemented by software, or by software in combination with necessary hardware. Therefore, the technical solution according to the embodiments of the present disclosure may be embodied in the form of a software product, which may be stored in a non-volatile storage medium (may be a CD-ROM, a U disk, a mobile hard disk, etc.) or on a network, including several instructions to cause a computing device (which may be a personal computer, a server, a terminal device, or a network device, etc.) to perform the method according to the embodiments of the present disclosure.

In an exemplary embodiment of the present disclosure, there is also provided a non-transitory computer-readable storage medium on which a program product capable of implementing the above method of this specification is stored. In some possible implementations, various aspects of the present disclosure may also be implemented in the form of a program product, which includes program code. When the program product is run on a terminal device, the program code is used to cause the terminal device to perform the steps according to various exemplary embodiments of the present disclosure described in the "Exemplary Method" section of this specification.

Figure 14:
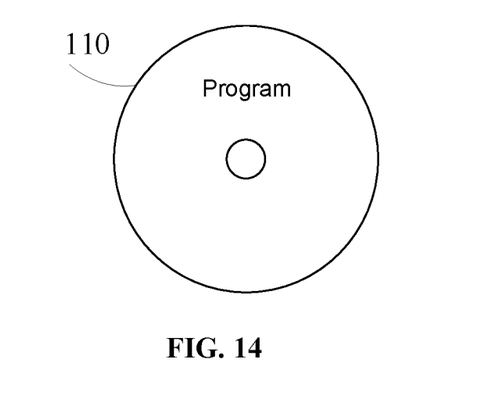
FIG. 14 schematically shows a schematic diagram of a program product of a method for evaluating environmental noise of device in an exemplary embodiment of the present disclosure.

Referring to FIG. 14, a program product 110 for implementing the above method according to an embodiment of the present disclosure is described, which may employ a portable Compact Disk Read-Only Memory (CD-ROM) and include program code, and may run on a terminal device (e.g., a personal computer). However, a program product of the present disclosure is not limited thereto, and in this document, the readable storage medium may be any tangible medium containing or storing a program, which may be used by or in combination with an instruction execution system, apparatus, or device.

The program product may employ any combination of one or more readable media. The readable medium may be a readable signal medium or a readable storage medium. The readable storage medium may be, for example but not limited to, an electrical, magnetic, optical, electromagnetic, infrared, or semiconductor system, apparatus, or device, or any combination of the above. More specific examples of readable storage media (non-exhaustive list) include: an electrical connection with one or more wires, a portable disk, a hard disk, a Random Access Memory (RAM), a Read Only Memory (ROM), an Erasable Programmable Read-Only Memory (EPROM or flash memory), an optical fiber, a portable Compact Disk Read-Only Memory (CD-ROM), an optical storage device, a magnetic storage device, or any suitable combination of the foregoing.

The computer-readable signal medium may include a data signal that is transmitted in baseband or as part of a carrier wave, in which readable program code is carried. This propagated data signal can take many forms, including but not limited to electromagnetic signals, optical signals, or any suitable combination of the above. The readable signal medium may also be any readable medium other than a readable storage medium, and the readable medium may send, propagate, or transmit a program for use by or in combination with an instruction execution system, apparatus, or device.

The program code contained on the readable medium may be transmitted using any appropriate medium, including but not limited to wireless, wired, optical fiber cable, RF, etc., or any suitable combination of the foregoing.

The program code for performing the operations of the present disclosure may be written in any combination of one or more programming languages including object-oriented programming languages such as Java, C++, etc., as well as conventional procedural programming language-such as "C" language or similar programming language. The program code may be executed entirely on the user's computing device, partly on the user's device, as an independent software package, partly on the user's computing device and partly on a remote computing device, or entirely on the remote computing device or server. In situations involving remote computing devices, the remote computing device may be connected to the user computing device through any kind of network, including a local area network (LAN) or a wide area network (WAN), or may be connected to an external computing device (for example, using Internet service provider to connect via the Internet).

In addition, the above-mentioned drawings are only schematic illustrations of processes included in the method according to the exemplary embodiment of the present disclosure, and are not intended to limit the purpose. It is easy to understand that the processes shown in the above drawings do not indicate or limit the chronological order of these processes. In addition, it is also easy to understand that these processes may be performed synchronously or asynchronously in multiple modules.

Those skilled in the art will easily think of other embodiments of the present disclosure after considering the specification and practicing the disclosure disclosed herein. This application is intended to cover any variations, uses, or adaptive changes of the present disclosure that follow the general principles of the present disclosure and include common general knowledge or common technical means in the technical field not disclosed in the present disclosure. The description and examples are to be considered exemplary only, and the true scope and spirit of this disclosure are pointed out by the appended claims.

What is claimed is:

1. A method for evaluating environmental noise of device, comprising:
    obtaining original image data to be displayed;
    determining at least part of the original image data to be displayed as source data;
    obtaining comparison data according to the source data; and
    obtaining a difference value according to the comparison data and the source data, and evaluating environmental noise of device according to the difference value, wherein the difference value is caused by a change of the comparison data and the source data during signal transmission,
    wherein the method further comprises:
    generating target image data to be displayed according to the comparison data and the original image data to be displayed; and
    sending the target image data to be displayed to an image display terminal,
    wherein in the target image data to be displayed, the comparison data and the source data are located in different address regions, and
    wherein the original image data to be displayed is an m*n image matrix, and the source data is k-th row data and/or j-th column data of the original image data to be displayed; and
    obtaining the comparison data according to the source data comprises: copying the k-th row data and/or the j-th column data as the comparison data, wherein m and n are positive integers greater than or equal to 1, k is a positive integer greater than or equal to 1 and less than or equal to m, and j is a positive integer greater than or equal to 1 and less than or equal to n.

2. The method according to claim 1, further comprising:
    storing the comparison data in an external memory; and
    sending the original image data to be displayed to an image display terminal.

3. The method according to claim 1, wherein:
    the comparison data is obtained by copying the k-th row data; and
    generating the target image data to be displayed according to the comparison data and the original image data to be displayed, comprises generating the target image data to be displayed as an (m+1)*n image matrix by:
        using the comparison data as i-th row data of the target image data to be displayed; and
        respectively using first to m-th row data of the original image data to be displayed as other row data of the target image data to be displayed other than the i-th row data, wherein i is a positive integer not equal to k, and greater than or equal to 1 and less than or equal to (m+1).

4. The method according to claim 1, wherein the comparison data is obtained by copying the j-th column data, and the generating the target image data to be displayed according to the comparison data and the original image data to be displayed, comprises generating the target image data to be displayed as an m*(n+1) image matrix by:
    using the comparison data as q-th column data of the target image data to be displayed; and
    using first to n-th column data of the original image data to be displayed as other column data of the target image data to be displayed other than the q-th column data, wherein q is a positive integer not equal to j, and greater than or equal to 1 and less than or equal to (n+1).

5. The method according to claim 1, wherein the method is implemented through execution of a computer program executable by at least one hardware processor, the computer program being stored on a non-transitory computer-readable medium.

6. The method according to claim 1, wherein the method is implemented by an apparatus comprising at least one hardware processor and a memory through execution of computer-readable instructions stored in the memory by the at least one hardware processor.

7. The method according to claim 3, wherein respectively using first to m-th row data of the original image data to be displayed as other row data of the target image data to be displayed other than the i-th row data comprises:
    using first to (i−1)-th row data of the original image data to be displayed as first to (i−1)-th row data of the target image data to be displayed;

using i-th row data of the original image data to be displayed as (i+1)-th row data of the target image data to be displayed; and using (i+1)-th to m-th row data of the original image data to be displayed as (i+2)-th to (m+1)-th row data of the target image data to be displayed.

8. The method according to claim 4, wherein using first to n-th column data of the original image data to be displayed as other column data of the target image data to be displayed other than the q-th column data comprises:

using first to (q−1)-th column data of the original image data to be displayed as first to (q−1)-th column data of the target image data to be displayed;

using q-th column data of the original image data to be displayed as (q+1)-th column data of the target image data to be displayed; and using (q+1)-th to n-th column data of the original image data to be displayed as (q+2)-th to (n+1)-th column data of the target image data to be displayed.

9. The method according to claim 7, wherein k is equal to m and i is equal to 1.

10. The method according to claim 8, wherein j is equal to n and q is equal to 1.

11. A method for evaluating environmental noise of device, comprising:

obtaining comparison data and original image data to be displayed, wherein at least part of the original image data to be displayed is source data, and the comparison data is obtained according to the source data;

obtaining a difference value according to the source data and the comparison data; and evaluating environmental noise of device according to the difference value, wherein the difference value is caused by a change of the comparison data and the source data during signal transmission, wherein obtaining the difference value according to the source data and the comparison data comprises: obtaining the difference value by performing any one or more of AND operation, OR operation, covariance operation, correlation function operation, and convolution operation on the source data and the comparison data.

12. The method according to claim 11, wherein:

the obtaining the comparison data and the original image data to be displayed, comprises:

respectively receiving the comparison data sent by an external memory and the original image data to be displayed sent by a processor; or receiving target image data to be displayed comprising the comparison data and the original image data to be displayed sent by the processor; and in the target image data to be displayed, the comparison data and the source data are located in different address regions.

13. The method according to claim 11, wherein the method is implemented through execution of a computer program executable by at least one hardware processor, the computer program being stored on a non-transitory computer-readable medium.

14. The method according to claim 11, wherein the method is implemented by an apparatus comprising at least one hardware processor and a memory through execution of computer-readable instructions stored in the memory by the at least one hardware processor.

15. A system for evaluating environmental noise of device, comprising:

at least one hardware processor; and a memory having computer-readable instructions stored thereon that, when executed by the at least one hardware processor, direct the at least one hardware processor to:

obtain comparison data and original image data to be displayed, wherein at least part of the original image data to be displayed is source data, and the comparison data is obtained according to the source data;

obtain a difference value according to the source data and the comparison data; and evaluate environmental noise of device according to the difference value, wherein the difference value is caused by a change of the comparison data and the source data during signal transmission, wherein the at least one hardware processor is further directed to:

generate target image data to be displayed according to the comparison data and the original image data to be displayed; and send the target image data to be displayed to an image display terminal, wherein in the target image data to be displayed, the comparison data and the source data are located in different address regions, and wherein the original image data to be displayed is an m*n image matrix, and the source data is k-th row data and/or j-th column data of the original image data to be displayed; and obtaining the comparison data according to the source data comprises: copying the k-th row data and/or the j-th column data as the comparison data, wherein m and n are positive integers greater than or equal to 1, k is a positive integer greater than or equal to 1 and less than or equal to m, and j is a positive integer greater than or equal to 1 and less than or equal to n.

* * * * *